United States Patent [19]
Sarem

[11] 3,709,641
[45] Jan. 9, 1973

[54] APPARATUS FOR PREPARING AND EXTRUDING A GELATINOUS MATERIAL

[75] Inventor: Amir M. Sarem, Yorba Linda, Calif.
[73] Assignee: Union Oil Company of California, Los Angeles, Calif.
[22] Filed: Aug. 3, 1970
[21] Appl. No.: 60,477

Related U.S. Application Data

[63] Continuation-in-part of Ser. No. 726,840, May 6, 1968, Pat. No. 3,558,759.

[52] U.S. Cl. .................................. 425/7, 425/67
[51] Int. Cl. ........................... B28b 1/54, B29b 1/02
[58] Field of Search ...... 264/142; 18/30 QM, 12 A, 12 P, 18/12 R, 1 B, 1 E; 425/7, 67

[56] References Cited

UNITED STATES PATENTS

| | | | |
|---|---|---|---|
| 3,208,829 | 9/1965 | Terenzi | 18/12 A UX |
| 2,749,590 | 6/1956 | Kilpatrick | 18/12 P X |
| 3,153,815 | 10/1964 | Seiol | 18/12 P X |
| 551,306 | 12/1895 | Converse et al. | 18/12 P |
| 452,743 | 5/1891 | Archibald et al. | 18/12 P |
| 2,712,693 | 7/1965 | Comparette | 18/12 P X |

Primary Examiner—J. Spencer Overholser
Assistant Examiner—B. D. Tobor
Attorney—Milton W. Lee, Richard C. Hartman, Lannas S. Henderson, Robert E. Strauss and Dean Sandford

[57] ABSTRACT

A method and apparatus for producing particulated gelatinous substances, such as gelatinous polymers, and solutions of these materials in which the gel is formed, in a reaction chamber equipped with a hydraulically actuated piston and perforate extrusion head and the gelatinous product is subsequently extruded into a stream of solvent or nonsolvent fluid flowing at relatively high velocity on the exterior of the perforate head. The gelatinous substance is displaced from the reaction chamber by introducing a fluid into the reaction chamber above the piston at a sufficiently elevated pressure to displace the substance from the chamber through the perforate extrusion head. The hydraulic pressure actuating the piston is adjusted to maintain the piston in pressure balance during the extrusion operation. Gravitational forces acting upon the piston cause it to rest upon the upper surface of the gelatinous mass and to advance downwardly through the reactor as the gel is displaced from the chamber. The method and apparatus of this invention is particularly suited for the preparation of aqueous polymer solutions useful as flooding agents in the recovery of petroleum by water flooding, and is especially adapted for installation at the site of a water injection well.

11 Claims, 11 Drawing Figures

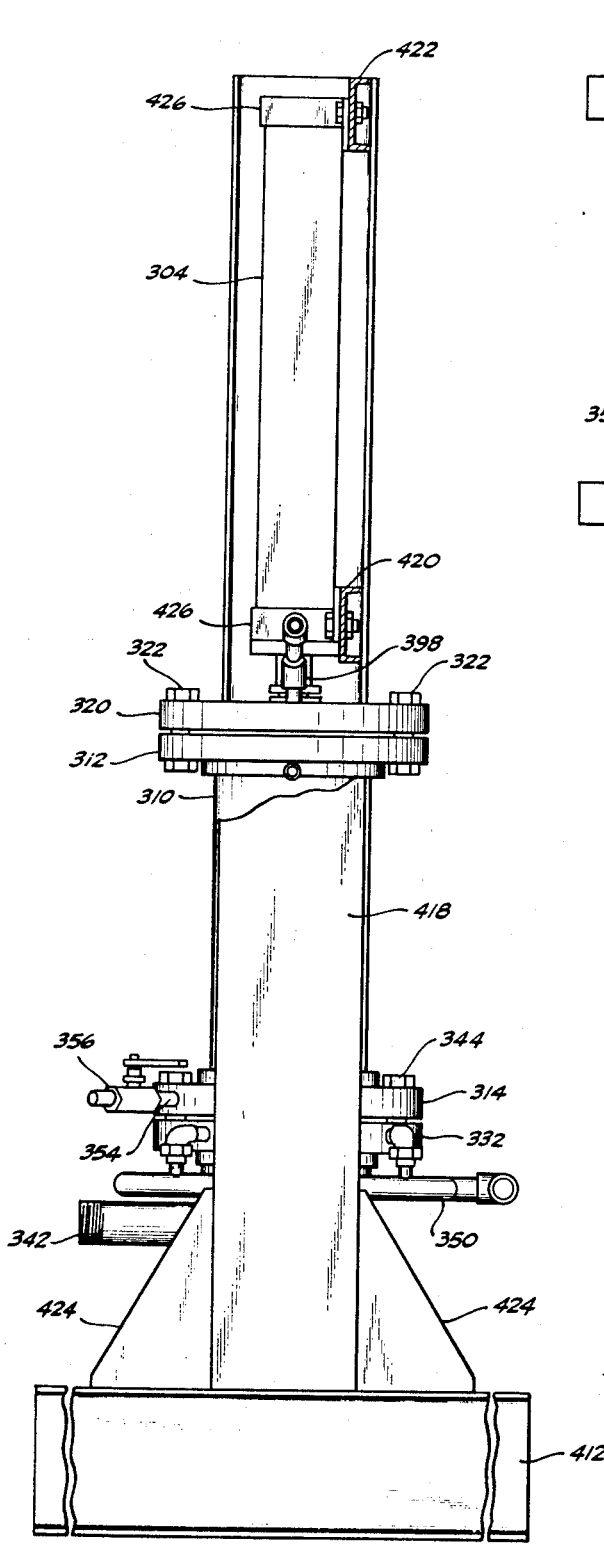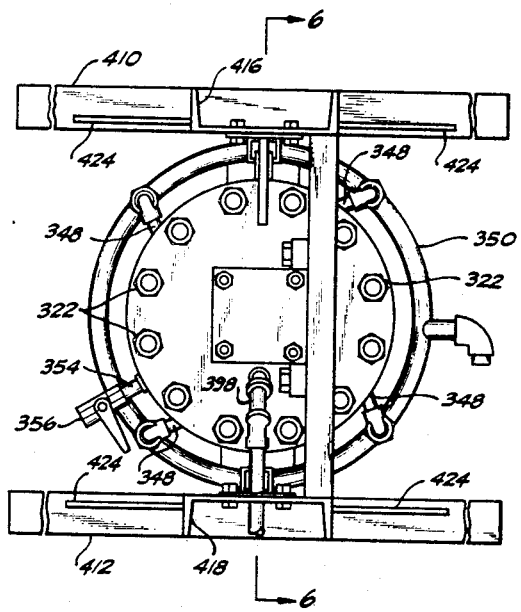
FIG-4
FIG-5

INVENTOR.
AMIR M. SAREM
BY
ATTORNEY

APPARATUS FOR PREPARING AND EXTRUDING A GELATINOUS MATERIAL

This is a continuation-in-part of application Ser. No. 726,840 filed May 6, 1968, now U.S. Pat. No. 3,558,759.

This invention relates to the particulation of gelatinous substances, and more particularly concerns apparatus for producing particulated gelatinous polymers and polymer solutions. One specific embodiment of the invention involves apparatus for producing aqueous polymer flooding solutions at the injection site which are useful in the recovery of petroleum by water flooding.

Various polymerization reactions and other processes are conducted that yield gelatinous products which are desirably particulated prior to drying or other processing, or which are subsequently dissolved in a suitable solvent to yield a solution of the product. Heretofore, difficulty has been experienced in conveniently and economically particulating or subdividing the gelatinous product for subsequent processing.

In another but related aspect, problems have been encountered in efficiently and economically producing polymer solutions useful in the recovery of petroleum by water flooding. It has been proposed to increase the efficiency and effectiveness of a water flooding operation by employing as the flooding agent an aqueous media rendered more viscous than ordinary water or brine by the incorporation therein of water-soluble agents, such as water-soluble organic polymers. These polymers are generally produced as viscous liquid or gelatinous products and subsequently dried to yield a solid product. The various polymers which have been suggested for use are largely available commercially in the form of powders, solid granules and pellets, or in other finely divided solid form. These solid polymers are generally difficult to dissolve or disperse in water, often necessitating excessive mixing to obtain homogeneous solutions. Also, the resulting polymer solutions prepared from the solid polymers must be strained or filtered to remove undissolved solids that would cause plugging of the formation on injection. This is both wasteful of polymer and time-consuming. Not only is additional processing cost involved in manufacturing the particulated solid polymer and subsequently redissolving it in water or brine to provide the aqueous flooding solution, but often the polymer also suffers some quality degradation during dehydration and storage. Thus, need exists for a simple and economical process for producing aqueous polymer solutions useful in the recovery of petroleum by water flooding that can be practiced at the site of the injection well, or in other field locations.

Accordingly, it is a principal object of this invention to provide improved means for particulating a gelatinous material. Another object of the invention is to provide apparatus for producing a particulated gelatinous polymer. Another object is to provide an improved apparatus for producing polymer solutions. Still another object is to provide apparatus for producing an aqueous polymer solution at the site of the injection well that is useful as a flooding agent in the secondary recovery of petroleum. A still further object is to provide an improved extrusion polymerization reactor. Other objects and advantages of the invention will be apparent from the following description.

Briefly, the present invention contemplates apparatus for producing both particulated gelatinous solids and solutions of the solid in which a gelatinous material is formed in a reaction chamber equipped with a hydraulically actuated, vertically movable piston and a perforate extrusion head, and the gelatinous material is subsequently extruded into a stream of solvent or non-solvent liquid flowing at relatively high velocity on the exterior of the perforate extrusion head. The gelatinous material is displaced from the reaction chamber by a fluid maintained under elevated pressure above the piston, the hydraulic pressure acting on the piston being adjusted to maintain the piston in pressure balance during the extrusion operation. Gravitational forces acting on the piston cause it to rest upon the upper surface of the gelatinous mass and to advance downwardly through the reactor as the gel is displaced from the chamber. The gelatinous product is extruded through the perforate extrusion head and into the liquid flowing on the exterior of the extrusion head, small pieces of the extruded gel being severed and carried away by the relatively high velocity liquid stream. These solid particles can be recovered from the liquid and dried, or they can be subjected to further treatment. Alternatively, a solvent liquid in which the particles of gelatinous extrudate dissolve to form a solution can be used to sever the extruded gel. One specific embodiment of the invention is particularly suited for the production of aqueous polymer solutions useful as flooding agents in the recovery of petroleum by water flooding, and is adapted for practice in a field location such as at the site of a water injection well.

The apparatus of this invention is broadly useful for particulating any gelatinous substance, and is particularly useful in producing a particulated gelatinous polymer. The term "gelatinous substance" as used herein is inclusive of polymer and non-polymeric jelly-like semisolids that substantially retain their shape when unconfined, but which can readily be conformed to the shape of their container. These materials can range in consistency from extremely viscous liquids to substantially solid substances, and for purposes of this invention include all substances which can be extruded by the application of pressure and which tend to retain their shape when particulated.

In the practice of this invention to produce polymeric products, a reactant monomer mixture, usually in the form of a solution of the reactant monomers, is charged to an extrusion reactor. A suitable catalyst, such as polymerization initiator or promoter, is admixed with the reactant monomer solution, either as the solution is charged to the reactor or after the solution is in the reactor. Once initiated, the polymerization reaction is allowed to proceed to completion in a conventional manner, or until a desired degree of polymerization has been attained, the resulting product of the reaction being a semisolid, gelatinous polymer. The polymer gel is extruded into a stream of solvent or nonsolvent liquid flowing at relatively high velocity on the exterior of the perforate extrusion head, small pieces of the extruded polymer being removed with the exiting fluid, and the particulated polymer subsequently being recovered from the liquid for further processing or being dissolved in the liquid to yield a solution of the polymer.

The invention will be more readily understood by reference to the accompanying drawings, of which:

FIG. 4 is a side elevation view of the extrusion reactor;

FIG. 5 is a top view of the extrusion reactor;

Figure 1:
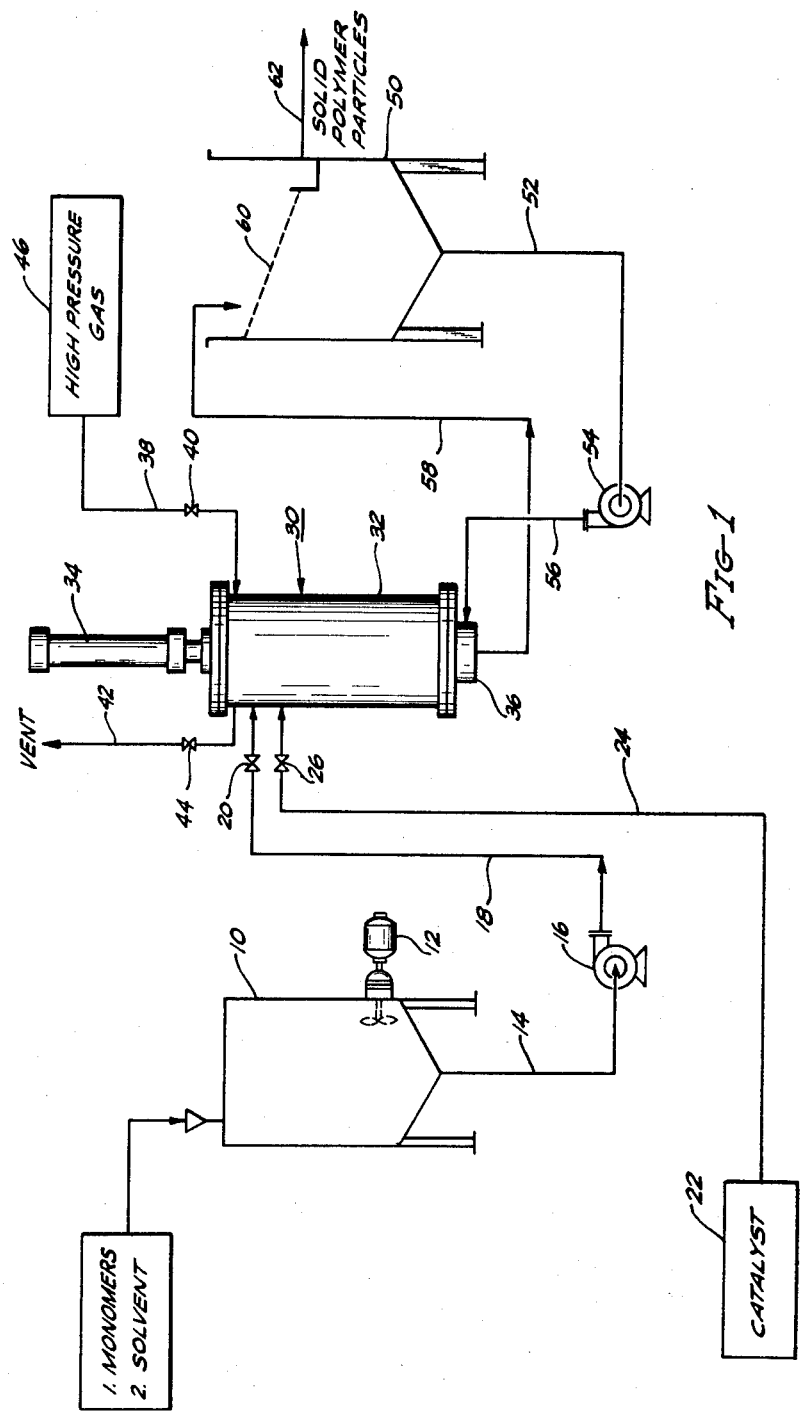
FIG. 1 is a schematic flow diagram of one embodiment of this invention adapted for the production of particles of solid polymer.

One mode of practicing this invention to produce a particulated solid polymer is illustrated in FIG. 1. A solution of reactant monomers, or a mixture of monomers is prepared in mixing vessel 10, which is equipped with means for mixing its contents, i.e., such as the illustrated motor driven propeller mixer 12. The monomers and a suitable solvent are charged to mixing vessel 10 in desired proportions and mixed to obtain a substantially homogeneous solution of the monomers. Monomer solution is withdrawn from vessel 10 through conduit 14 and transferred to extrusion reactor 30 by means of pump 16 and conduit 18. The polymerization reaction is initiated by introducing a suitable catalyst or initiator into the monomer solution, such as by transferring catalyst from catalyst supply means 22 through conduit 24 to reactor 30, as illustrated, or by introducing the catalyst into the monomer solution passing through conduit 18. Mixing vessel 10 and catalyst supply means 22 can be isolated from reactor 30 by valves 20 and 26 in conduits 18 and 24, respectively. Extrusion reactor 30 is generally comprised of a closed reaction vessel 32 equipped with a piston moved vertically through the vessel 32 by hydraulic drive unit 34. An extrusion head 36, constructed so that liquid can be circulated on the exterior of an internal perforate member through which the polymer is extruded, is located at one end of vessel 32. HIgh pressure inert gas from high pressure gas source 46 is introduced into reaction vessel 32 through conduit 38 at a rate controlled by valve 40. Gases can be vented from reaction vessel 32 by means of conduit 42 and valve 44. A liquid in which the polymer particles are substantially insoluble is circulated from separator 50 to extrusion head 36 by means of conduit 52, pump 54 and conduit 56. Liquid carrying the suspended polymer particles is returned to separator 50 through conduit 58. Solid polymer particles are separated from the liquid by screen 60 and recovered at 62.

In operation, a solution of monomers of the desired concentration is prepared in mixing vessel 10. With the piston retracted, monomer solution and catalyst are transferred to reaction vessel 32 or, alternatively, the catalyst is introduced into the monomer solution passing through conduit 18. If desired, air can be removed from the reaction vessel prior to charging the reactant by purging the vessel with a substantially oxygen-free inert gas, by successively pressuring the depressuring the vessel, or by drawing a vacuum in the vessel and then breaking the vacuum with inert gas. After a desired degree of polymerization has been completed, liquid circulation is established from separator 50 through extrusion head 36. The gelatinous polymerization product is particulated by extrusion into the circulating nonsolvent liquid passing through the extrusion head. Extrusion is accomplished by introducing a fluid, i.e., a gas or a liquid, into the reaction vessel above the piston at a sufficiently elevated pressure to displace the gelatinous polymer from the vessel through the perforate extrusion head. The hydraulic pressure actuating hydraulic drive unit 34 is adjusted to maintain the piston in pressure balance during the extrusion operation, as will be hereinafter more fully described, so that the piston rests upon the upper surface of the gelatinous mass and advances downwardly through the reaction chamber as the gel is displaced from the chamber because of the gravitational forces acting upon the piston. The gelatinous polymerization product exits the reaction vessel through perforate extrusion head 36 and is sheared into small particles by the liquid passing at relatively high velocity on the exterior of the perforate member. The liquid containing the particulate polymer is returned to separator 50 and solid particles of the polymer recovered. The recovered polymer can be subjected to further processing steps, such as washing, drying, grinding, chemical treatment and the like, if desired, and the solid polymer particles can be segregated into suitable size ranges. Alternatively, the liquid circulated through extrusion head 36 can be a solvent for the extruded polymer and the polymeric product recovered as a solution in this liquid.

Although the method and apparatus of this invention can be employed to effect the polymerization of many different monomers and mixtures of monomers, it is particularly useful in producing copolymers of acrylic acid and acrylamide, and terpolymers of acrylic acid, acrylamide and diacetone acrylamide by the polymerization of the monomers in aqueous solution in the presence of organoboron catalyst as described in U. S. Pat. No. 3,476,186 and in copending application Ser. No. 692,791 filed Dec. 22, 1967. The water-soluble acrylic acid-acrylamide and acrylic acid-acrylamide-diacetone acrylamide copolymers produced by this technique are especially useful as thickening agents for water or brine employed in the recovery of petroleum from subterranean oil-bearing formations by water flooding.

The acrylic acid-acrylamide copolymer is prepared by copolymerizing acrylic acid and acrylamide in aqueous solution with an organoboron catalyst. The acrylic acid-acrylamide-diacetone acrylamide terpolymer is prepared by including diacetone acrylamide monomer in the reactant monomer solution. The resulting polymeric product is a viscous liquid or gel comprising a substantially linear water-soluble copolymer having a minimum of cross-linking and possessing superior water thickening and other desirable properties, these properties being to some extent controlled by the selection of monomer types, proportions and the reaction conditions.

The polymerization catalysts useful in initiating these polymerization reactions are organoboron compounds and particularly organoboron compounds having the following generalized formula:

wherein $R_1$, $R_2$ and $R_3$ are alkyl radicals, and preferably are alkyl radicals having less than about four carbon atoms in the alkyl group. Thus, the preferred catalyst comprise a group of trialkylboron compounds having methyl, ethyl, propyl, butyl and isobutyl substituent groups. These compounds can be mixed alkylborons in that two or more different alkyl groups are contained in the molecule, or the alkyl groups can be the same. Exemplary of this latter class of compounds are trimethylboron, triethylboron, tripropylboron, tri(n-butyl)boron and tri(isobutyl)boron. Further, it is within the scope of this invention to employ a mixture of the foregoing trialkylboron compounds as the catalytic polymerization agent. Also, various boronous anhydrides and boronites exhibit the requisite catalytic properties.

While the exact mechanism of the organoboron initiated polymerization reaction is not clearly understood, it is believed that the reaction is of the free radical type initiated by a peroxide formed by the reaction of organoboron with trace quantities of oxygen. The organoboron is also believed to complex with the free radical at the end of the polymer chain in such a way that termination of the reaction becomes less likely, resulting in the formation of polymers having molecular weights higher than would be produced in the absence of the organoboron compound. Further, the organoboron catalyzed reaction may result in a polymer having a different composition or a different distribution of substituent groups along the polymer chain that would be obtained by the other methods of polymerization. Thus, while I do not desire to be held to any particular theory of operation, it has nevertheless been demonstrated that polymer compositions prepared by this technique are superior in many important properties to those prepared by other polymerization techniques.

Although the presence of trace quantities of oxygen are believed necessary to initiate the free radical polymerization reaction, the presence of excess oxygen terminates the polymerization reaction prematurely, thus resulting in a lower molecular weight polymer product. While it is preferred that excess oxygen be removed prior to initiating the reaction, polymerization with organoborons may be successful even though a relatively large quantity of oxygen is initially present in the reaction mixture since most of the oxygen is consumed by reaction with the organoboron to produce more highly oxidized boron compounds which are not effective in providing free radicals. Thus, the amount of oxygen in contact with the reactant solution during the polymerization reaction can be controlled to suitable levels by evacuating and purging the reaction vessel of air to remove excess undissolved oxygen from the system prior to initiating the polymerization reaction, the optimum content of oxygen dissolved in the reactant solution being a molar concentration about equal to the molar concentration of the organoboron compound present. Accordingly, it is preferred in most applications that the reactant monomer solution contain between about 15 and about 600 ppm of dissolved oxygen based on the monomer content of the solution. Excess dissolved oxygen can be removed from the reactant solution, if desired, by stripping with an oxygen-free gas. Conversely, in those cases where the reaction mixture is totally devoid of the necessary quantity of oxygen to initiate the free radical reaction, it is within the scope of this invention to add oxygen to the reaction mixture.

The polymerization of the acrylic monomers usually can be initiated at room temperature although some mild heating may be necessary in certain polymerization reactions. These reactions are generally exothermic and are accompanied by a release of heat causing an increase in reactant temperature. While normal temperature increases can be accommodated with no particular problem, too high of a rate for the exothermic polymerization reaction would cause a significant increase in temperature, especially, after the solution has thickened so that heat dissipation is impaired. With increased temperature, further increases in polymerization rate result. This tendency toward "run away" polymerization is greater with a higher concentration of monomers in solution. HIgher temperatures can also cause cross-linking of the polymer resulting in the formation of polymers having reduced water solubilities and other inferior properties. With most of the organoboron initiated reactant systems, it is preferred that the reaction temperature be controlled below about 65° C. Accordingly, it is preferred that the concentration of monomers be controlled below the level that will cause a temperature increase of a magnitude that will result in "run away" polymerization, and more particularly at temperatures below about 65° C. In most applications, excessive temperatures are not encountered at reactant concentrations below about 30 weight percent monomer mixture. Further, the reaction mixture can be cooled to prevent excessive temperatures. Although the minimum amount of the organoboron catalyst required to initiate the reaction will depend somewhat on the oxygen content of the system, as hereinbefore disclosed, it has nevertheless been found that polymerization of most systems can be initiated at catalyst concentrations of 5–200 ppm of boron based on the weight of monomers present. Since the molecular weights of various catalysts are different, catalyst additions are conveniently based on boron content, it being understood that different amounts of the various organoboron compounds must be employed to provide equivalent quantities of boron.

In one preferred mode of practicing this invention, aqueous solutions of acrylic polymers, such as the aforementioned acrylic-acid-acrylamide and acrylic acid-acrylamide-diacetone acrylamide copolymers, can be prepared which are particularly useful as thickening agents for flood water employed in the recovery of petroleum by water flooding. In this mode of practicing the invention, an aqueous solution of the reactant monomers is prepared and charged to an extrusion reactor from which a major portion of the oxygen has been removed. The polymerization reaction is initiated by adding a small amount of organoboron catalyst to the monomer solution, either in the extrusion reactor or as it is being transferred into the reactor. Once initiated, the polymerization reaction is allowed to proceed to completion, or until a desired degree of polymerization has been attained. The product of this reaction is a semisolid gelatinous polymer which is at least to a limited extent soluble in water. The gelatinous polymer is extruded into a stream of aqueous liquid flowing at relatively high velocity on the exterior of the perforate extrusion head. Small pieces or particles of the extruded polymer are severed by the impinging liquid and carried to the neutralization vessel for reaction with a suitable base, such as sodium hydroxide, to form a carboxylate. The relatively concentrated, neutralized polymer solution is then further diluted with aqueous liquid to yield a polymeric concentrate available for further use, such as addition to the flood water injected into a subterranean petroleum reservoir.

Figure 2:
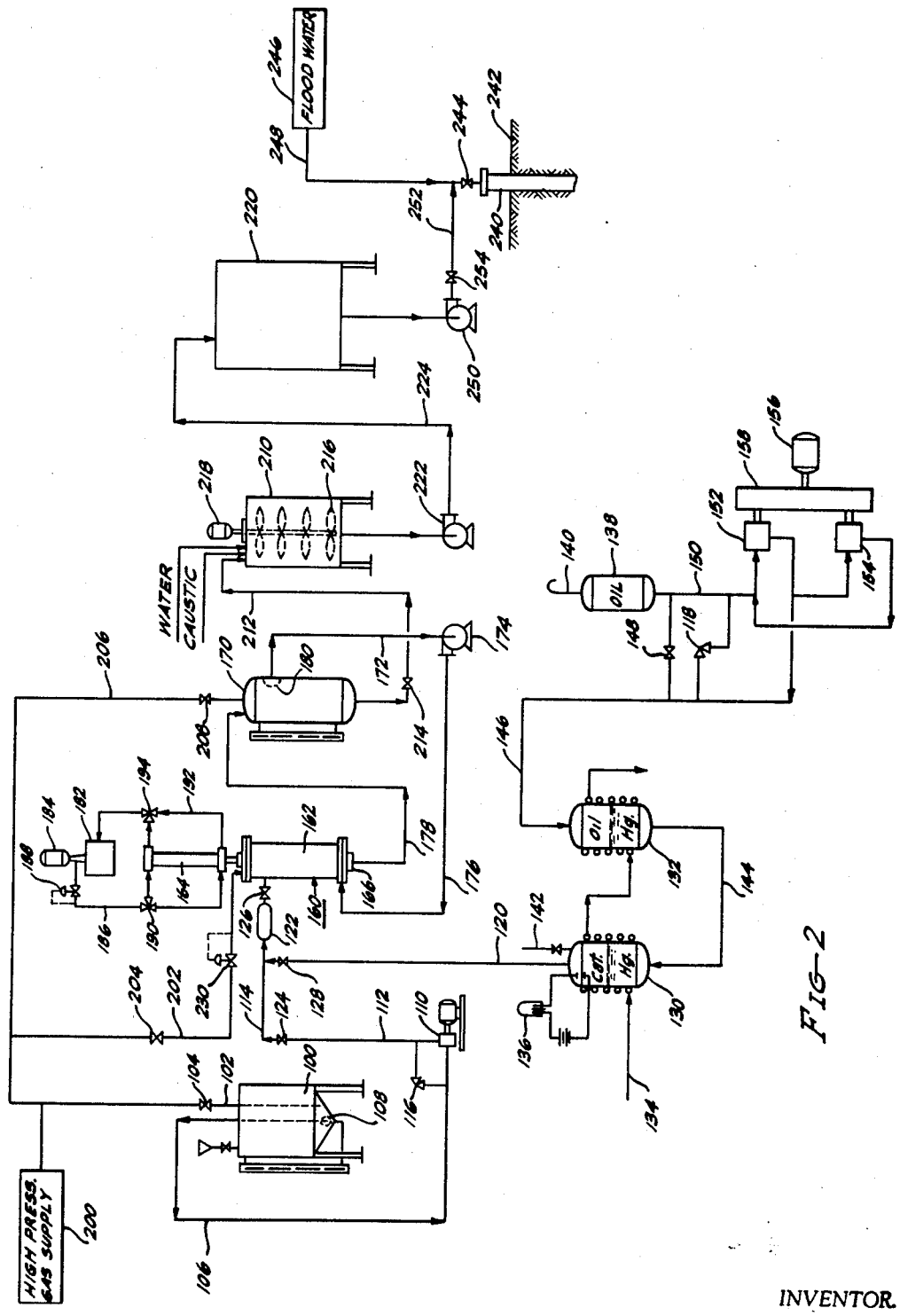
FIG. 2 is a schematic flow diagram of another embodiment of this invention adapted for the production of polymer solutions useful as flooding agents in the secondary recovery of petroleum.
Figure 3:
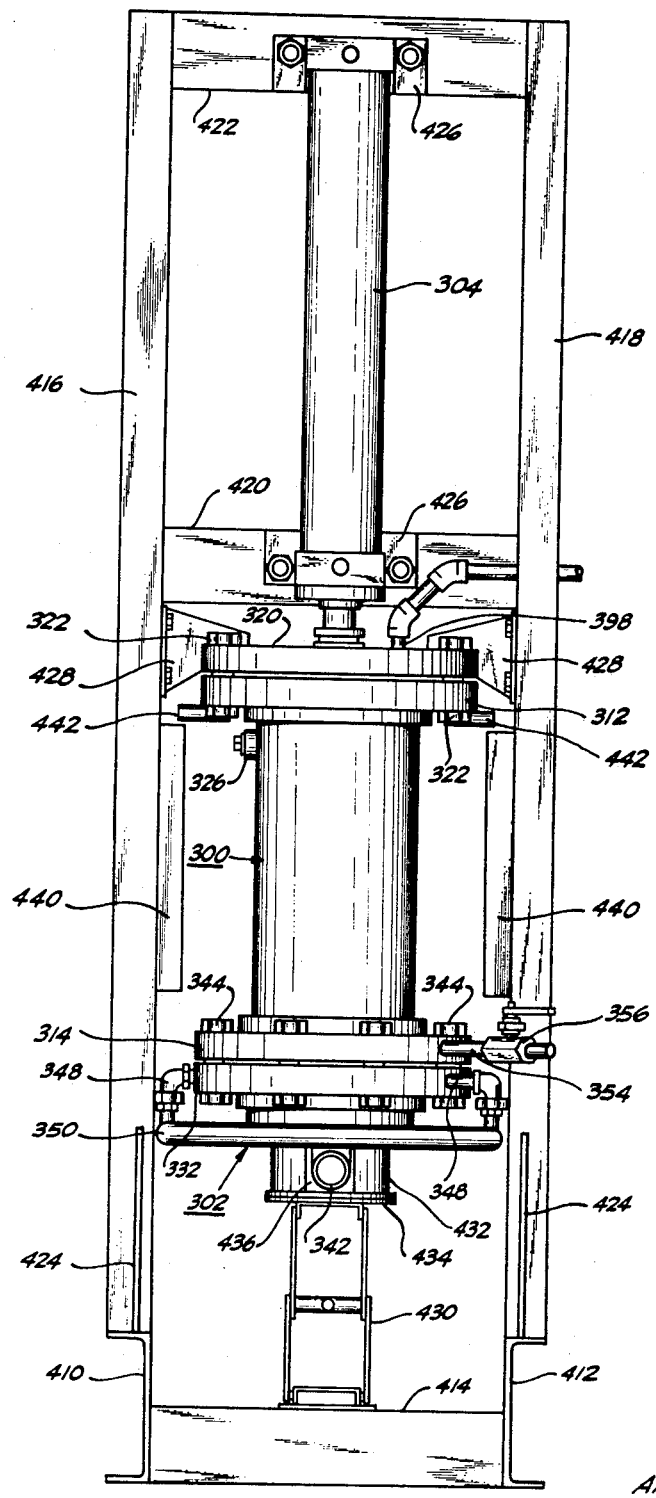
FIG. 3 is a front elevation view of the extrusion polymerization reactor of this invention.
Figure 6:
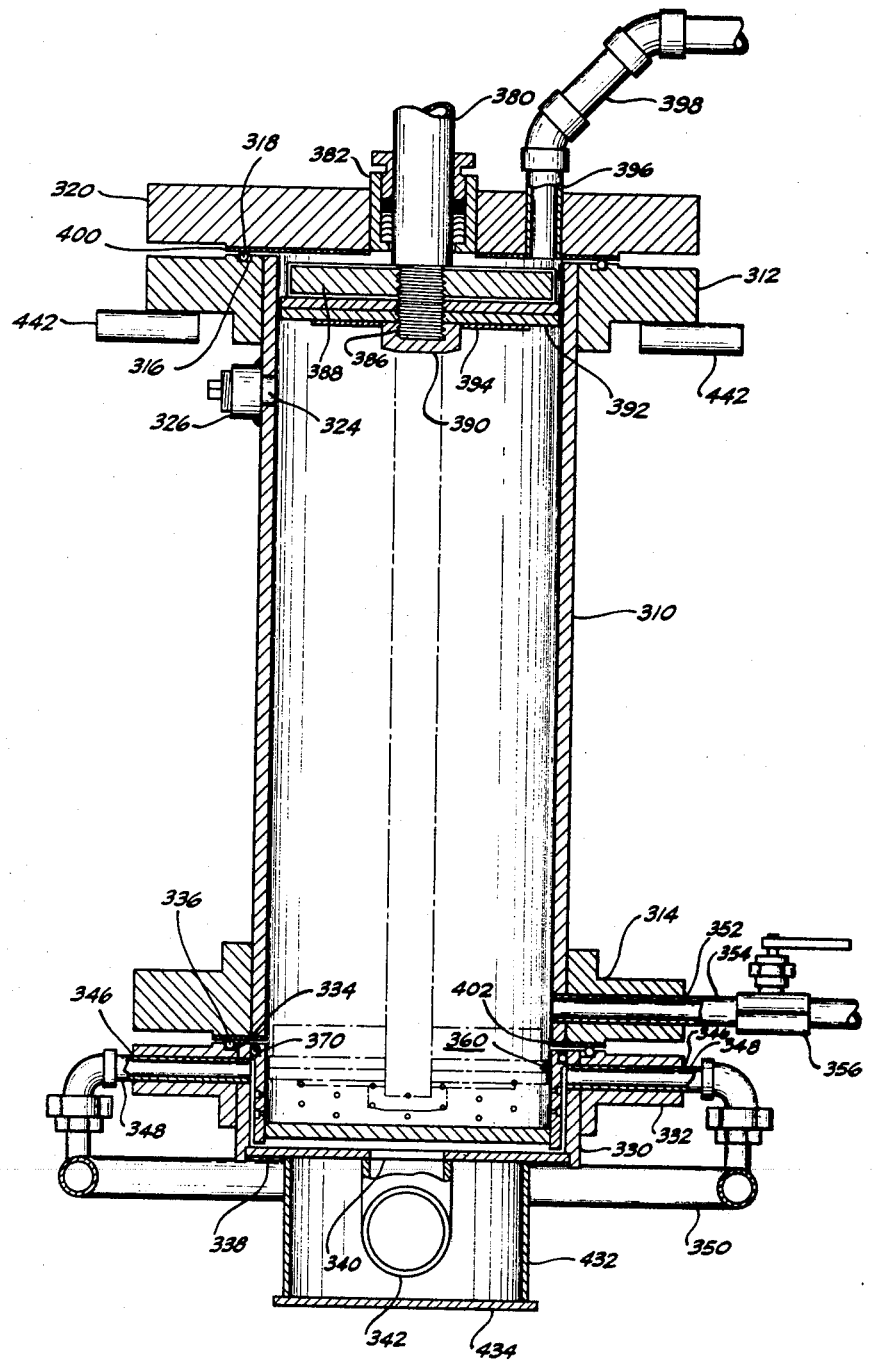
FIG. 6 is a cross-sectional view of the reaction vessel taken along the line 6—6 of FIG. 5.
Figure 7:
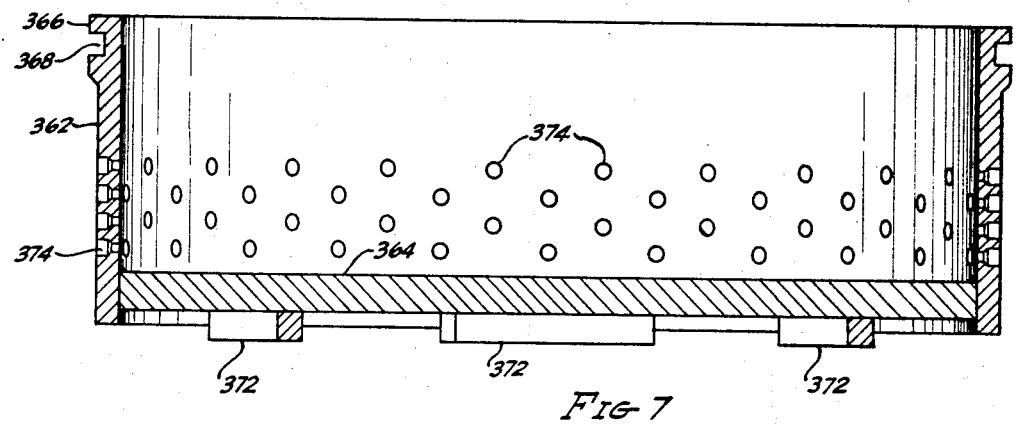
FIG. 7 is an enlarged view of the perforate extrusion head.

This mode of producing aqueous solutions of acrylic polymers is further illustrated in FIG. 2. The reactant monomer solution is prepared in covered mixing vessel 100. A substantially oxygen-free inert gas having a low solubility, such as nitrogen, helium, or the like, is bubbled into the monomer solution through conduit 102 at a rate controlled by valve 104. Conduit 102 can be fitted with a sparger or other device, not shown, that distributes the gas more uniformly through the liquid. THe inert gas bubbling through the liquid mixes the monomer solution, strips oxygen from the solution to reduce its dissolved oxygen content, and displaces air from the mixing vessel. Alternatively, mixing vessel 100 can be provided with a mechanical mixer, such as a motor driven propeller or paddle mixer. Monomer solution is withdrawn from vessel 100 through conduit 106, which terminates adjacent to the bottom of the vessel and is fitted with a suitable inlet screen 108. This construction is employed to avoid a bottom suction line which could become plugged with solid monomer. Monomer solution withdrawn from vessel 100 through conduit 106 is transferred to extrusion reactor 160 by pump 110 and conduits 112 and 114. Relief valve 116 protects the pump and piping from excessive pressure. A small quantity of organoboron catalyst is introduced by means of conduit 120 to the monomer solution flowing to the extrusion reactor, and these reactants mixed by passing through inline mixer 122 located in conduit 114. Inline mixer 122 can be of the type disclosed in my copending application Ser. No. 701,617, filed Jan. 30, 1968, in which conduit 120 is connected to a side nozzle of the mixer. Alternatively, catalyst can be injected directly into the monomer solution in extrusion reactor 160. Mixing vessel 100 and the catalyst system can be isolated from the extrusion reactor by valves 124, 126 and 128 in conduits 112, 114 and 120, respectively.

Many of the organoboron compounds useful in initiating polymerization of acrylic monomers are spontaneously ignited on contact with air. Accordingly, care must be exercised in the handling and storage of these materials. Also, difficulty has been encountered in obtaining pumping equipment capable of delivering the extremely low volume flow rates encountered in injecting the organoboron catalyst into the reactant mixture. One embodiment of catalyst storage and injection equipment that largely overcomes these problems is schematically illustrated in FIG. 2. This apparatus comprises a pair of small closed vessels 130 and 132 that are provided with cooling coils 134 through which water can be circulated to prevent the liquid contents of the vessels from becoming overheated. Vessel 130 is provided with level alarm 136 to indicate that the volume of catalyst is near depletion. Mineral oil or similar liquid is stored in a third vessel 138 that is open to the atmosphere through vent 140. Mercury, or other high density immiscible liquid, is employed as a displacement fluid to displace catalyst from vessel 130, thus preventing the oil soluble catalyst from contacting the mineral oil. The liquid organoboron catalyst, or a solution of the catalyst in a suitable solvent, is charged to vessel 130 through inlet connection 142 without contact with air. As the catalyst is introduced into vessel 130, mercury is displaced to vessel 132 through conduit 144 and mineral oil is displaced from vessel 132 to vessel 138 through conduit 146 and bypass valve 148. Valve 148 is closed at the completion of the filling operation. Catalyst is charged to the reaction system by pumping mineral oil from vessel 138 through conduits 150 and 146 to vessel 132. An equal volume of mercury is displaced from vessel 132 to vessel 130 through conduit 144, and a similar volume of catalyst is displaced from vessel 130 through conduit 120. The volume of catalyst delivered is controlled by the volume of mineral oil pumped into vessel 132. As catalyst is displaced from vessel 130, the level of mercury in vessel 130 increases until the electrically conductive mercury completes the alarm circuit energyzing alarm light 136, or other alarm or shutdown device. Sufficient mercury is contained in the system so that it is not completely displaced from vessel 132 when the volume of catalyst in vessel 130 is depleted. With this embodiment of apparatus, only mineral oil must be pumped, thereby eliminating the handling of mercury or catalyst in the pumping equipment.

The extremely low flow rates are achieved by transferring mineral oil from vessel 138 with a pair of small positive displacement pumps 152 and 154 connected so that a small differential volume of liquid is discharged into vessel 132. Pump 152 is connected so that it takes suction on vessel 138 through conduit 150 and discharges both into the suction of pump 154 and into conduit 146, and pump 154 discharges into the suction of pump 152. The system is protected from over pressure by relief valve 118. Pump 152 is constructed with a slightly higher volumetric capacity, or is operated at a slightly higher speed, so that only the difference in volume between the volumes pumped by pumps 152 and 154 is discharged into conduit 146. One means of controlling the net volume pumped is to employ two pumps having the same volumetric capacity, and to operate the pumps at slightly different speeds. This can be readily accomplished with a constant speed electric motor 156 by driving the pumps through gear drive 158 in which each pump is driven by drive gears having slightly different gear ratios. The net volume pumped can be controlled by employing a variable speed drive unit so that the master drive speed can be varied to control the volumetric rate pumped to the reaction system, with the proportional volume pumped by each pump remaining in a ratio fixed by the respective gear ratios.

Extrusion reactor 160 is generally comprised of a closed reaction vessel 162 equipped with a piston that is moved longitudinally through the vessel by hydraulic drive unit 164. An extrusion head 166 that contains an internal perforate member through which polymer is extruded is located at the end of reaction vessel 162. Extrusion head 166 is constructed so that liquid can be circulated on the exterior surface of the perforate member to sever the extruded polymer and to carry the severed polymer particles from the extrusion head. In this embodiment of the invention, a reservoir of water or other solvent liquid is maintained in recirculation vessel 170. Liquid is withdrawn from vessel 170 through conduit 172 and circulated through extrusion head 166 by means of pump 174 and conduit 176. Liquid and extruded polymer is returned to vessel 170 through conduit 178. The polymer at least partially dissolves in the circulating liquid and, being more dense than water, tends to settle to the bottom of recirculation vessel 170. Accordingly, it is preferred that the recirculated liquid be withdrawn from vessel 170 at a point near the liquid surface. Conduit 172 is provided at its inlet with screen 180 to prevent recirculation of undissolved polymer particles.

The piston can be longitudinally moved through vessel 162 to any vertical position by hydraulic drive unit 164, which is also used to maintain the piston in pressure balance during the extrusion operation. Hydraulic drive unit 164 is powered by a hydraulic system comprised of hydraulic fluid reservoir 182, hydraulic pump 184, high pressure conduit 186 containing three-way valve 190, and low pressure conduit 192 containing three-way valve 194. Hydraulic fluid is pumped from reservoir 182 to one or the other ends of drive unit 164 depending on the setting of valve 190. Hydraulic fluid is returned to reservoir 182 from the opposite end of the drive unit through low pressure conduit 192. The direction of movement of the piston is controlled by positioning three-way valves 190 and 194. The hydraulic fluid supplied to the hydraulic drive unit is maintained at a preset value by pressure regulator 188. Alternatively, hydraulic drive unit 164 can be driven by high pressure gas, thus eliminating the need for reservoir 182 and pump 184.

Extrusion of the gelatinous polymer from reaction vessel 162 is accomplished by introducing high pressure gas into the vessel at a point above the piston to maintain in the vessel a pressure elevated sufficiently to displace the gelatinous polymer from the vessel through the perforate extrusion head. High pressure gas is supplied from high pressure gas supply 200 through conduit 202 containing valve 204 and pressure regulator 230. Regulator 230 maintains the pressure in reaction vessel 162 at a preset value during the extrusion operation. The hydraulic pressure actuating hydraulic drive unit 164 is adjusted to maintain the piston in pressure balance during the extrusion operation, as will be hereinafter more fully described, so that the piston rests upon the upper surface of the gelatinous mass and, because of the gravitational forces acting upon the piston, it advances downwardly through the reaction chamber as the gel is displaced from the chamber.

Neutralization vessel 210 is an open mixing vessel equipped with mixing paddles 216 rotatably driven by electric motor 218. On completion of the extrusion operation, the polymer solution and any undissolved polymer contained in recirculation vessel 170 are transferred to neutralization vessel 210 through conduit 212 provided with valve 214. The polymer solution can be conveniently pressured from vessel 170 by means of high pressure gas supplied from high pressure gas source 200 through conduit 206 at a rate controlled by valve 208. Caustic and additional water are added to the polymer solution in vessel 210 and its contents mixed until the neutralization reaction is complete and the polymer solution substantially homogeneous. Thereafter, the polymer solution is transferred from neutralization vessel 210 to polymer concentrate tank 220 by means of pump 222 and conduit 224.

Mixing vessel 100, extrusion reactor 160, recirculation vessel 170, neutralization vessel 210, and the pumps, catalyst injection and auxiliary equipment can be conveniently mounted on a skid to provide a portable unit adapted for easy movement to a field location.

The above described polymerization apparatus can be installed in a field location such as at the site of a water injection well or wells, and used to produce a water soluble thickening agent for flood water. In the embodiment illustrated in FIG. 2, injection well 240 penetrates the earth 242 and is completed in a subterranean oil-bearing strata in conventional manner. Well 240 is provided with a well head valve 244, such as a conventional Christmas tree assembly. Fresh water or brine is transferred from flood water source 246 through conduit 248 and injected into injection well 240 in conventional manner. Polymer concentrate is withdrawn from polymer concentrate tank 220 by pump 250 and transferred through conduit 252 to conduit 248, at a rate controlled by valve 254, whereupon the polymer concentrate is introduced in a minor proportion into the flood water injected into the well to form therein a dilute aqueous polymer solution useful as a flooding agent. Other conventional means of admixing the polymer concentrate and the flood water to produce a dilute aqueous polymer solution can be employed.

In a preferred method of producing a viscous aqueous flooding solution, aqueous monomer solution containing about 10 to 30 percent by weight acrylic monomer is prepared in mixing vessel 100. The monomer can comprise a single reactive acrylic compound, or a mixture of reactive acrylic monomers, such as a mixture containing about 5 to 40 parts by weight acrylic acid and 60 to 95 parts by weight acrylamide, or a mixture containing about 15 to 35 parts by weight acrylic acid, 45 to 80 parts by weight acrylamide, and 2 to 15 parts by weight diacetone acrylamide. Substantially oxygen-free inert gas, such as nitrogen or helium, is bubbled through the monomer solution in mixing vessel 100 to mix the solution, to reduce the dissolved oxygen content of the solution, and to displace air from the vessel. Air is removed from reaction vessel 162 by purging with substantially oxygen-free inert gas and, with the piston retracted, monomer solution is transferred to the reaction vessel. Organoboron catalyst is added to the monomer solution transferred to the reaction vessel to initiate the polymerization reaction, and polymerization is allowed to proceed until a gelatinous polymer of the desired molecular weight is obtained.

Upon completion of the polymerization reaction, water is charged to the recirculation vessel and recirculation established through the extrusion head 166. Gas is introduced at the top of reaction vessel 162 at a pressure elevated sufficiently to displace the polymer gel from the reaction vessel and the pressure of the hydraulic fluid supplied to hydraulic drive unit 164 adjusted to maintain the piston in pressure balance, as will be more fully disclosed hereinafter. The extrusion rate is adjusted by varying the gas pressure, higher pressures causing an increase in extrusion rate and lower pressures reducing the extrusion rate. The extrusion rate is preferably maintained below the rate at which extruded polymer cannot be carried out of the extrusion head by the circulated liquid, and accumulates in the head causing plugging. Hydraulic pressure is adjusted to maintain it in a fixed ratio with the gas pressure.

Polymer extruded from the reaction vessel is severed from the extrusion head by the relatively high velocity water stream flowing on the exterior of the perforate head. The polymer is at least partially dissolved in the water, and the polymer solution and undissolved polymer particles are returned to recirculation vessel 170. At the completion of the extrusion operation, the polymer solution and undissolved polymer particles are transferred to neutralization vessel 210. A base, preferably a monovalent base, such as ammonium hydroxide, sodium hydroxide, or potassium hydroxide, and additional water are added to the polymer solution in vessel 210. Preferably, sufficient base is employed to neutralize the carboxylic acid groups of the polymer to carboxylates and to increase the pH of the solution to a value of about 8 to 10. The solution is mixed until the polymer is substantially completely dissolved and a homogeneous solution produced. The solution is then transferred to polymer concentrate tank 220 for storage until required.

The polymer concentrate produced in this manner can be employed as a thickening agent for flood water used in the recovery of petroleum by water flooding. Water or brine is injected into a subterranean petroleum reservoir through a water injection well in conventional manner. A small amount of polymer concentrate is added to the flood water to produce therein a concentration of about 0.002 to 0.5 weight percent polymer. This small amount of polymer renders the flood water more viscous and improves its effectiveness for oil displacement. Alternatively, the polymer solution produced in the foregoing manner can be employed for other uses, such as flocculation, thickening, soil stabilization, and the like.

The various vessels can be sized so that a substantially continuous supply of polymer concentrate is available from the otherwise batch process, and to eliminate unnecessary steps. For example, mixing vessel 100 can have sufficient capacity to permit the mixing of enough monomer solution for several polymerization reactions, and polymer concentrate tank 220 can be sized so that sufficient polymer concentrate is available for continuous withdrawal in the desired quantities. Extrusion reactor 162 must have sufficient capacity to meet this demand, or two or more units employed to produce the polymer concentrate.

One embodiment of the extrusion polymerization reactor of this invention is illustrated in FIGS. 3 through 7 of the drawings, wherein similar reference numerals refer to like parts in the several views. The extrusion reactor is comprised of a reaction vessel, generally designated by reference numeral 300, which is supported in a vertical position by a suitable frame. Extrusion head 302 is mounted at the lower end of reaction vessel 300. Hydraulic power unit 304 actuates a piston in reaction vessel 300 and is adapted to move the piston longitudinally through the vessel to any vertical position therewithin, and to apply a force to the piston to maintains it in pressure balance during the extrusion operation.

Reaction vessel 300 is a closed pressure vessel comprised of an elongated cylindrical shell 310 having end flanges 312 and 314 attached at either end by convenient means, such as by welding. Shell 310 can be conveniently constructed from a section of pipe. End flange 312 is provided with a circumferential groove 316 in its mating face adapted to receive O-ring gasket 318. End plate 320 mates with flange 312 to provide a fluid tight closure. End flange 312 and end plate 320 each have a plurality of matching holes spaced substantially uniformly about their peripheries adapted to receive volts 322. Shell 310 is apertured at 324 and fitted with connector 326 adapted to receive the reactant inlet conduit. Extrusion head 302 is comprised of outer cylindrical member 330 having flange 332 attached thereto, as by welding. Flange 332 is provided with circumferential groove 334 in its mating face adapted to receive O-ring gasket 336. Cylindrical member 330 is closed at its lower end by end plate 338 which is fluid-tightly attached about its periphery to member 330, as by welding, to form a unitary outer housing for the extrusion head. Bottom plate 338 is apertured at 340 and fitted with outlet conduit 342 through which recirculated liquid and polymer exits the extrusion head. Flanges 314 and 332 each have a plurality of matching holes spaced substantially uniformly about their peripheries to accommodate bolts 344 which fluid-tightly attach the extrusion head flange 314 to form the bottom section of the reaction vessel. Cylindrical member 330 and flange 332 are drilled to provide four substantially equally spaced trangential holes 346 which are adapted to receive liquid inlet conduits 348 that communicate with the interior of the extrusion head. Conduits 348 are connected to recirculated liquid supply conduit 350 to provide means for introducing a solvent or nonsolvent liquid into the extrusion head. Flange 314 and shell 310 are drilled at 352 to receive conduit 354 that is fitted with valve 356 to provide means for sampling and venting the reaction vessel.

Perforate extrusion member 360 is a basket shaped member adapted to removably fit within the outer cylindrical member 330. As more particularly illustrated in FIG. 7, internal extrusion member 360 is comprised of perforate cylindrical member 362 and imperforate circular bottom plate 364 attached about its periphery to cylindrical member 362. Cylindrical member 362 is provided with outwardly projecting lip 366 having a peripheral groove 368 about its circumference adapted to receive O-ring gasket 370. This construction provides a fluid-tight seal between the interior of member 330 and the exterior of member 362 at lip 366 and maintains the perforate extrusion member 360 in spaced relationship within the member 330. Lugs 372 on the exterior of bottom plate 364 maintain member 360 in spaced relationship with bottom plate 338. Thus, cylindrical perforate member 360 is fluid-tightly mounted in spaced relationship within the outer housing, a clearance of about 0.05 inches being maintained between the exterior of member 362 and the interior of member 330, with a somewhat larger clearance between the bottom members. Liquid is introduced tangentially into this annular space through the conduits 348 and passes along the perforate face of member 362, through the space below member 360, and exits through conduit 342. Cylindrical member 362 contains a plurality of perforations 374 substantially uniformly disposed about its circumference. Perforations 374 are preferably drilled through member 362 and countersunk from the exterior. The diameter of the perforations in part determines the size of polymer particle extruded and should be selected to produce the desired particle size. Perforate extrusion member 360 can be easily replaced with a similar unit having different size apertures to accommodate the production of different size particles.

Hydraulic actuator 304 is a conventional double acting hydraulic power cylinder containing a piston that is moved longitudinally through the cylinder by regulation of the pressure of the fluid supplied to the cylinder. Hydraulic actuator 304 is mounted in a vertical position above reaction vessel 300 so that movement of the piston within actuator 304 imparts axial movement to piston rod 380. An aperture is provided at the center of top plate 320 and fitted with packing gland 382 to provide a fluid-tight seal around the axially movable rod 380. End plate 320 is also apertured at 396 to receive gas inlet conduit 398. Piston rod 380 is threaded at 386 to receive piston 388 and nut 390. Piston 388 is a flat plate adapted to loosely fit within reaction vessel 300. Since the primary purposes of the piston are to prevent channelling of the injected displacement fluid through the polymer gel during extrusion and to prevent retention of substantial polymer gel on the vessel wall, the seal between piston 388 and the vessel wall is not fluid-tight. While the piston can be formed from a single circular metal plate 388, it is preferred that it also include one or more plastic plates 392, that are slightly larger in diameter than plate 388, and a metal backing plate 394.

Since some of the materials handled in reaction vessel 300 may be corrosive, it is advisable to construct the parts exposed to the corrosive environment of corrosion resistant materials, such as stainless steels, or to clad or otherwise line the vessel to protect it from corrosion. For example, in the illustrated apparatus, end plate 320 and bottom flange 314 are provided with an overlay or cladding of stainless steel at 400 and 402, respectively, on their interior surfaces. Shell 310 and other metal members exposed to the corrosive environment can be constructed of corrosion resistant metals or otherwise lined to reduce corrosion.

Vessel 300 and hydraulic actuator 304 can be supported by a suitable frame which can comprise a pair of base channels 410 and 412 maintained in spaced relationship by crossmember 414, and a pair of vertical channels 416 and 418 maintained in spaced relationship by crossmembers 420 and 422. Lateral support for the vertical members is provided by two pair of gusset plates 424. Hydraulic actuator 304 is attached to members 420 and 422 by a pair of clamps 426. End plate 320 is rigidly supported in a horizontal position from vertical channels 416 and 418 by a pair of brackets 428 that are welded to the end plate and bolted to the respective vertical members. Reaction vessel 300 is attached to and suspended below rigidly mounted end plate 320.

Reaction vessel 300 can be lowered for cleaning and repair by removing bolts 322, or only the extrusion head can be lowered by removing bolts 344. Lowering of either the extrusion head or the entire reaction vessel is facilitated by means of jack 430 that is mounted on cross-member 414 and adapted to bear against a base comprised of cylindrical member 432 attached to bottom plate 338 and enclosed at its bottom by plate 434. Cylindrical member 432 is cutout at 436 to accommodate circuit 342. A pair of guide tracks 440 located on the inside of each of the vertical support members and a corresponding pair of projecting lugs 442 welded to flange 312 cooperate to maintain the reaction vessel in substantially vertical alignment as it is raised or lowered.

Figure 10:
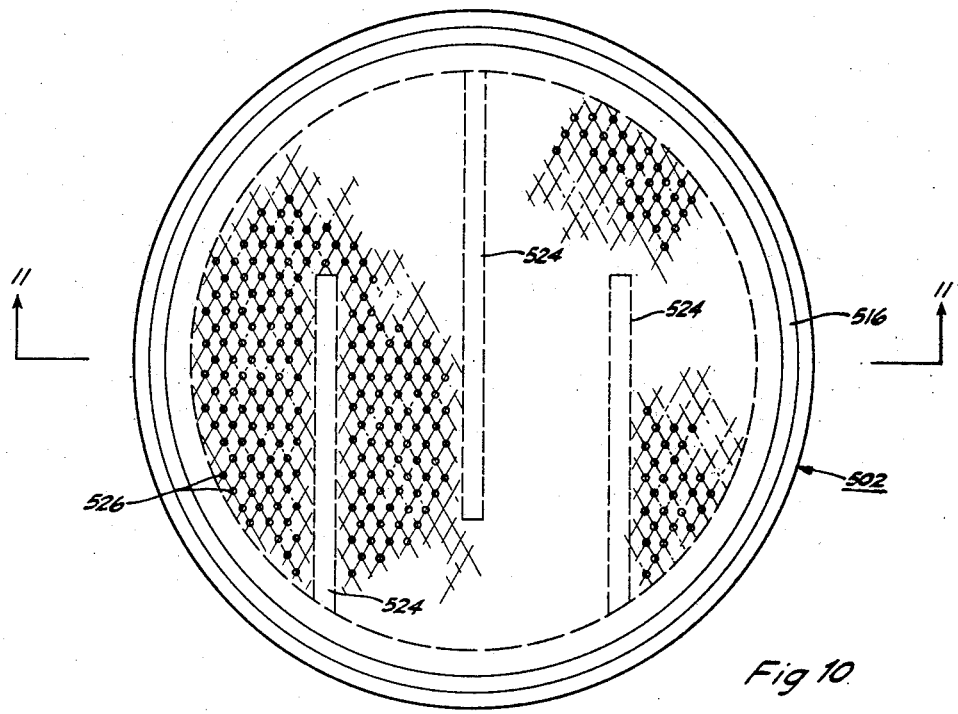
FIG. 10 is a top view of the embodiment of perforate extrusion head illustrated in FIG. 9.
Figure 9:
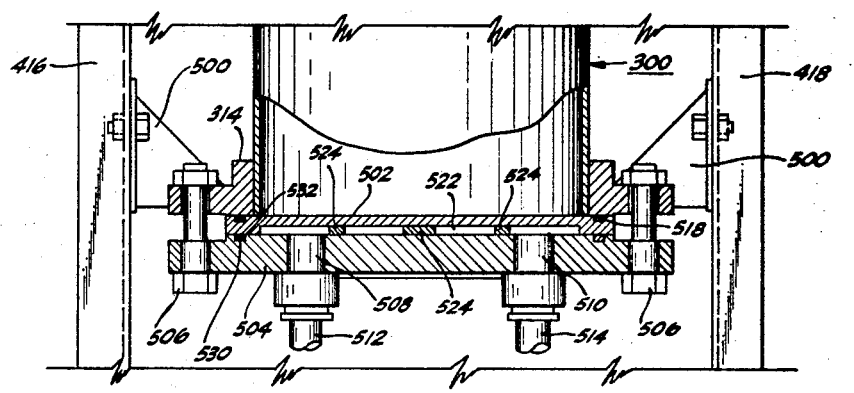
FIG. 9 is a partially cutaway view of the lower section of the extrusion reactor showing another embodiment of extrusion head.
Figure 11:
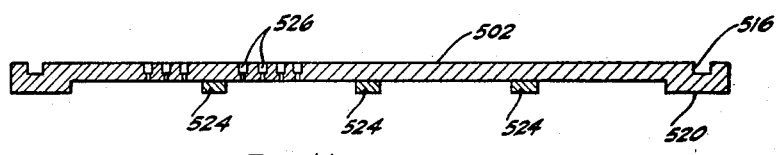
FIG. 11 is a cross-sectional view of this embodiment of perforate extrusion head taken along the line 11—11 of FIG. 10.

Another embodiment of the invention employing an extrusion head utilizing a horizontal perforate member is illustrated in FIGS. 9, 10 and 11. Reaction vessel 300 having a bottom flange 314 is supported in a substantially vertical position by a suitable frame as described previously. Bottom flange 314 is attached to vertical channels 416 and 418 by brackets 500. The extrusion head of this embodiment is comprised of flat perforate plate 502 and end plate 504 attached at the bottom of vessel 300. End plate 504 mates with flange 314 to provide a fluid tight closure, and both bottom flange 314 and end plate 504 have a plurality of matching holes spaced substantially uniformly about their peripheries adapted to receive bolts 506. Groove 530 is provided about the periphery of the end plate to accommodate O-ring 532. Bottom plate 504 is apertured at 508 and 510, and fitted with liquid inlet conduit 512 and liquid outlet conduit 514, respectively, to convey liquid to the extrusion head and to carry away the liquid and extruded particles.

Perforate plate 502 is provided with a peripheral groove 516 in its upper surface to accommodate O-ring 518, and a peripheral lip 520 on its bottom surface to maintain the bottom of perforate plate 502 spaced above the upper surface of bottom flange 504 to define a fluid flow cavity 522. Also, a number of flow directing baffles 524 are provided on the lower surface of perforate plate 502 to direct the flow of liquid through cavity 522. Perforate plate 502 is provided with a plurality of perforations 526 through which the gelatinous material in the vessel is extruded. The diameter of these perforations are preferably reduced adjacent to the lower surface of plate 502 to provide reduced diameter outlets.

When reacting an initial bath of polymer, a solid plate is inserted between flanges 314 and 332 to prevent the reactant monomer solution from entering the extrusion head. On completion of the reaction, the plate can be removed without spilling the gelatinous polymer. The plate need be used on only the initial run following cleaning of the reactor, as otherwise, sufficient polymer gel remains within perforate member 360 to prevent the monomer solution from entering the extrusion head and attendant piping.

Polymer gel is extruded from the reaction vessel by a fluid maintained in the vessel at an elevated pressure. Although this fluid can be a liquid and particularly a substantially non-solvent liquid, it is preferred that extrusion be accomplished by injecting a gas into the vessel above the gelatinous mass. The use of inert gases, such as nitrogen and helium, are particularly preferred. The pressure of the hydraulic fluid supplied to the hydraulic actuator is adjusted to maintain the piston in pressure balance so that it rests on the upper surface of the gelatinous mass and moves downwardly through the vessel by the force of gravity as polymer is withdrawn from the vessel. It has been found that extrusion of the polymer by the application of a major portion of the force by the hydraulic actuator causes polymer to bypass around the piston and to accumulate above the piston, thus precluding its extrusion. Avoidance of polymer bypassing would necessitate the use of a carefully machined cylinder and a sealed piston, thereby adding additional cost and limiting the practical size of the extrusion reactor. Further, it has been found that extrusion by gas displacement alone, without the use of a balanced piston, is impractical as the gas quickly channels through the polymer mass leaving most of the polymer unextruded. However, extrusion can be effectively accomplished by a gaseous atmosphere maintained at elevated pressure in the vessel if a piston is maintained at the polymer surface under conditions such that the forces acting on the piston due to pressure are balanced.

The pressure of the fluid introduced into the reaction vessel above the polymer mass is adjusted to maintain extrusion at a desired rate. The extrusion rate should not be so high as to cause polymer to accumulate in the extrusion head or to cause the outlet conduit to become plugged with polymer. The pressure of the hydraulic fluid is then adjusted to maintain the pressure forces acting on the piston balanced during the extrusion operation. The amount of hydraulic pressure necessary to maintain the piston balanced depends upon the relative sizes of the pistons.

Figure 8:
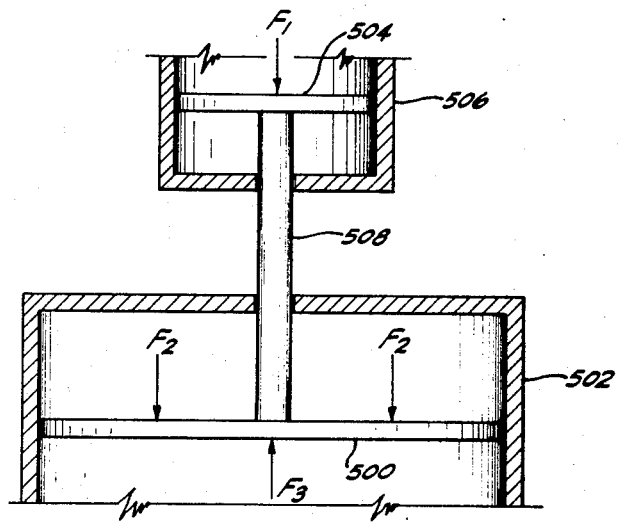
FIG. 8 is a diagram illustrating the forces due to pressure acting on the piston during the extrusion operation.

The nature of the forces due to pressure acting upon the piston are illustrated in FIG. 8 wherein piston 500 represents the piston in extrusion reactor 502, piston 504 represents the piston in hydraulic actuator 506, and rod 508 represents the piston rod interconnecting these two pistons. As illustrated in the drawing, if the gravitational forces acting on the piston and friction are neglected, piston 500 is at equilibrium, or pressure balanced, when $$F_1 + F_2 = F_3 \qquad (1)$$

wherein $F_1$ is the force exerted by the hydraulic pressure in hydraulic actuator 506, $F_2$ is the force exerted by the fluid pressure upon the upper surface of piston 500 and force $F_3$ is the force exerted by fluid pressure on the lower surface of piston 500. Since the force is equivalent to the product of the pressure and the surface area upon which it is acting, equation (1) can be expressed as $$P_1A_1 + P_2A_2 = P_3A_3 \qquad (2)$$

wherein $P_1$ is the pressure of the hydraulic fluid, $A_1$ is the surface area of piston 504, $P_2$ is the pressure of the fluid above piston 500, $A_2$ is the area of the upper surface of piston 500, $P_3$ is the pressure of the fluid below piston 500 and $A_3$ is the area of the bottom surface of piston 500.

Since piston 500 is not sealed in extrusion reactor 502, the fluids above and below the piston are at the same pressure and $P_2 = P_3$. Equation (2) can be rewritten as $$P_1A_1 = P_2A_3 - P_2A_2$$

$$P_1A_1 = P_2(A_3 - A_2)$$

$$P_2/P_1 = A_1/(A_3 - A_2) \qquad (3)$$

Accordingly, the ratio of the extrusion pressure in reactor 502 to the pressure of the hydraulic fluid supplied to hydraulic actuator 506 at equilibrium can be predicted from a consideration of the geometry of the respective pistons. The forces acting on piston 500 are unbalanced by virtue of the fact that the top surface of piston 500 has a smaller effective area due to the area occupied by shaft 508. Thus, sufficient force is exerted on piston 500 by the hydraulic actuator to maintain piston 500 under balanced pressure. The pressure forces acting on piston 500 will be balanced under all conditions wherein the ratio of extrusion pressure to hydraulic pressure is as defined in equation (3), the force of gravity then being the only net force acting to move the piston downwardly. While it is preferred that the piston be maintained balanced during the extrusion operation, satisfactory operation can be obtained so long as the ratio of the pressure in the reaction vessel to that of the hydraulic fluids is no less than the ratio calculated in accordance with equation (3). Accordingly, the pressures should be adjusted so that the ratio of the pressure in the reactor to the hydraulic pressure is equal to or exceeds the calculated ratio.

The improved extrusion polymerization method of this invention is further demonstrated by the following examples which are presented by way of illustration, and are not intended as limiting the spirit and scope of the invention as defined by the appended claims.

EXAMPLE 1

An aqueous solution containing about 15 weight percent acrylic monomers is prepared by dissolving acrylic monomers in the proportion of about 1 parts by weight acrylic acid and 2 parts by weight acrylamide in water. This solution is charged to an extrusion reactor from which oxygen has been removed by purging with a substantially oxygen-free inert gas. The extrusion reactor is equipped with a hydraulically actuated piston and a perforate extrusion head in accordance with the apparatus of this invention. Polymerization is initiated by adding triethylboron catalyst to the monomer solution in the extrusion reactor in an amount equivalent to 20 parts of boron per million parts of monomer. The polymerization reaction is allowed to proceed for 16 hours before extrusion is started.

On completion of the polymerization reaction, isopropyl alcohol is circulated across the face of the perforate extrusion head at relatively high velocity and extrusion initiated by injecting nitrogen into the reactor above the polymer mass. A pressure of 60 psig is maintained in the extrusion reactor during the extrusion operation and the pressure of the hydraulic fluid supplied to the hydraulic actuator is adjusted to balance the pressure forces acting on the piston during extrusion. Polymer is extruded through the perforate extrusion head and into the stream of isopropyl alcohol flowing across the face of the extrusion head. The extruded polymer is severed by the impinging liquid stream and the severed polymer particles carried out of the extrusion head by the exiting liquid. The polymer is substantially insoluble in the isopropyl alcohol and is recovered from the liquid to yield a particulated solid polymer product.

EXAMPLE 2

An aqueous solution of a water soluble acrylic acid-acrylamide-diacetone acrylamide copolymer useful as a thickening agent for flood water is prepared in the apparatus of this invention which is located at the site of the water injection well. In accordance with the method of this invention, an aqueous solution containing about 20 weight percent acrylic monomers is prepared in the mixing vessel by dissolving about 27 parts by weight acrylic acid, 63 parts by weight acrylamide, and 10 parts by weight diacetone acrylamide in water. The solution is mixed and excess dissolved oxygen removed by bubbling substantially oxygen-free nitrogen gas through the solution. This solution is transferred to an extrusion reactor from which a major portion of the oxygen has been excluded by purging with nitrogen. A solution of tri(n-butyl)boron dissolved in dioxane is added to the monomer solution transferred to the reactor in an amount equivalent to about 50 parts of boron per million parts of monomer. Polymerization is allowed to proceed for about 24 hours.

On completion of the polymerization reaction, water circulation is established from the recirculation vessel, through the extrusion head and back to the recirculation vessel. Extrusion is initiated by injecting nitrogen into the reactor above the piston so as to maintain a pressure of 200 psig therein. The pressure forces acting on the piston are balanced by adjusting the pressure of the hydraulic fluid supplied to the hydraulic actuator to 40 psig. Polymer is extruded through the perforate extrusion head and into the stream of water flowing across the face of the extrusion head. The extruded polymer is severed by the impinging liquid stream and at least a portion of the polymer particles are dissolved. The polymer solution and undissolved polymer particles are accumulated in the recirculation vessel. On completion of the extrusion operation, the polymer solution and undissolved polymer particles are transferred to the neutralization vessel. Sodium hydroxide and additional water are added in an amount sufficient to neutralize the substituent carboxylic acid groups and to adjust the pH of the polymer solution of a value of 8.8, and the solution mixed until homogeneous.

The polymer concentrate produced in the foregoing manner is added to the flood water injected into the subterranean petroleum reservoir in an amount sufficient to establish therein a concentration of 0.05 weight percent. The dilute aqueous solution of acrylic acid-acrylamide-diacetone acrylamide copolymer is an effective flooding agent for the recovery of petroleum by water flooding.

Various embodiments and modifications of this invention have been described in the foregoing specification, and further modifications will be apparent to those skilled in the art. Such modifications are included within the scope of this invention as defined by the following claims.

Having now described the invention, I claim:

1. Apparatus for producing a gelatinous extrudate, which comprises:
    a vessel;
    means for supporting said vessel in a vertical position;
    an extrusion head integrally mounted at the bottom of said vessel so as to form the bottom closure thereof, said extrusion head containing an internal perforate member through which a gelatinous material formed in said vessel is extruded, and said extrusion head being constructed so that a liquid can be flowed across the exterior face of said perforate member;
    means for introducing a material into said vessel that reacts therewithin to form a gelatinous product;
    a piston of slightly smaller diameter than the inside diameter of said vessel mounted in said vessel on an axially movable rod passing out of said vessel through a fluid-tight seal;
    means for moving said piston longitudinally through said vessel and for applying a force to said piston;
    means for introducing a high pressure fluid into said vessel in the space behind said piston so as to maintain an elevated pressure therein whereby the gelatinous product is extruded through said perforate member;
    means for flowing a liquid across the exterior face of said internal perforate member so as to sever the gelatinous material extruded through said perforate member; and
    means for withdrawing liquid and severed material from said extrusion head.

2. The apparatus defined in claim 1 wherein said vessel is an elongated cylindrical vessel and said piston comprises a circular plate.

3. The apparatus defined in claim 1 wherein said means for moving said piston longitudinally through said vessel and for applying a force to said piston comprises a hydraulic operator adapted to axially move said rod.

4. Apparatus for producing a gelatinous product and for subsequently extruding the product into a flowing liquid, which comprises:
    a frame adapted to support said apparatus;
    a top head comprising a circular plate attached to said frame and rigidly supported thereby in a horizontal position;
    an elongated cylindrical shell terminating at each end in a flange, one of said flanges being adapted to mate with said top head and being bolted thereto whereby said shell is fluid-tightly attached to and vertically suspended below said top head;

an extrusion head adapted to mate with the bottom flange of said shell and being fluid-tightly bolted thereto so as to form the bottom closure of said shell, said extrusion head containing an internal perforate member through which the gelatinous product is extruded, and said extrusion head being constructed so that a liquid can be flowed across the exterior face of said perforate member;

an axially movable rod passing through a fluid-tight seal in said tophead;

a piston of slightly smaller diameter than the inside diameter of said shell attached to said rod and mounted in said shell, said piston being adapted to move longitudinally through said shell;

means for moving said piston longitudinally within said shell and for applying a force to said piston;

means for introducing a material into said shell that reacts therewithin to form the gelatinous product;

means for introducing a high pressure fluid into said shell in the space behind said piston so as to maintain an elevated pressure therein whereby the gelatinous product is extruded through said perforate member;

means for flowing a liquid across the exterior face of said internal perforate member so as to sever the gelatinous product extruded through said perforate member; and means for withdrawing liquid and severed product from said extrusion head.

5. The apparatus defined in claim 4 wherein said extrusion head comprises an outer cylindrical member terminating at one end in a flange adapted to fluid-tightly mate with the bottom flange of said shell, said member being fluid-tightly closed at its other end by a plate attached about its periphery to said cylindrical member and adapted to receive an outlet conduit, and wherein said internal perforate member comprises a cylindrical perforate member closed at its bottom by an imperforate plate attached about its periphery to said perforate cylindrical member, said perforate cylindrical member having an outwardly-projecting circumferential lip at its upper end adapted to fluid-tightly engage the interior of said outer cylindrical member, said internal perforate member being vertically positioned in spaced relationship within said outer cylindrical member.

6. The apparatus defined in claim 5 wherein said means for flowing a fluid across the exterior face of said internal perforate member comprises a fluid inlet conduit passing around said extrusion head on the exterior thereof, and a plurality of conduits communicating therewith adapted to introduce liquid tangentially into the annular space between the exterior of said perforate cylindrical member.

7. The apparatus defined in claim 4 wherein said extrusion head comprises a substantially flat cylindrical end plate adapted to mate with the bottom flange of said shell and being fluid-tightly bolted thereto so as to form the bottom closure of said shell, and wherein said internal perforate member is a substantially flat, cylindrical perforate plate adapted for support above the upper surface of said end plate so as to define a flow cavity between said perforate plate and said end plate.

8. The apparatus defined in claim 7 including flow directing baffles on the under surface of said perforate plate to direct the liquid flow across the lower surface of said perforate plate.

9. The apparatus defined in claim 4 including a jack to assist in raising and lowering said cylindrical shell and said extrusion head to facilitate assembly and disassembly of said apparatus, and guide means to maintain said cylindrical shell in a vertical position while it is being raised or lowered.

10. The apparatus defined in claim 4 wherein said piston comprises a circular metal plate of slightly smaller diameter than the inside diameter of said shell.

11. The apparatus defined in claim 4 wherein said piston comprises at least one circular plastic plate of slightly smaller diameter than the inside diameter of said shell, and a circular metal plate of still smaller diameter positioned above and adjacent to said plastic plate.

* * * * *